United States Patent
Shire et al.

[15] 3,695,639
[45] Oct. 3, 1972

[54] CONNECTOR

[72] Inventors: Harold Shire, Los Angeles; Ira R. Newman, Lakeview Terrace, both of Calif.

[73] Assignee: General Connectors Corporation, Burbank, Calif.

[22] Filed: Aug. 7, 1970

[21] Appl. No.: 62,003

[52] U.S. Cl. ................... 285/114, 285/351, 285/231
[51] Int. Cl. ............................................. F16l 13/04
[58] Field of Search ............. 285/351, 231, 224, 114; 277/DIG. 2, DIG. 3

[56] References Cited

UNITED STATES PATENTS

| | | | |
|---|---|---|---|
| 3,583,730 | 6/1971 | Kozlowski | 285/351 X |
| 2,422,158 | 6/1947 | Wolfram | 285/351 X |
| 2,196,622 | 4/1940 | Bean | 285/114 X |
| 3,211,472 | 10/1965 | Rickard | 285/351 X |

FOREIGN PATENTS OR APPLICATIONS

| | | | |
|---|---|---|---|
| 1,569,442 | 5/1969 | France | 285/231 |

*Primary Examiner*—Andrew V. Kundrat
*Attorney*—Julius L. Rubinstein

[57] ABSTRACT

The invention is characterized by two generally ring shaped seals mounted in spaced side by side relationship at the end of a connector housing. The outer seal is generally circular in cross-section and the inner seal is generally channel shaped in cross-section and includes a first leg, and a second smaller leg connected together by a web portion. The end of the connector tube is provided with formations for holding the seals in the housing. These formations may include first and second counterbores for positioning the inner seal in the end of the connector housing. The base of the second counterbore is normally in spaced relation to the inner side of the second leg to permit the legs of the inner seal to flex when a pipe mounted in the connector pivots or vibrates.

14 Claims, 15 Drawing Figures

PATENTED OCT 3 1972
3,695,639
SHEET 1 OF 4
FIG. 1
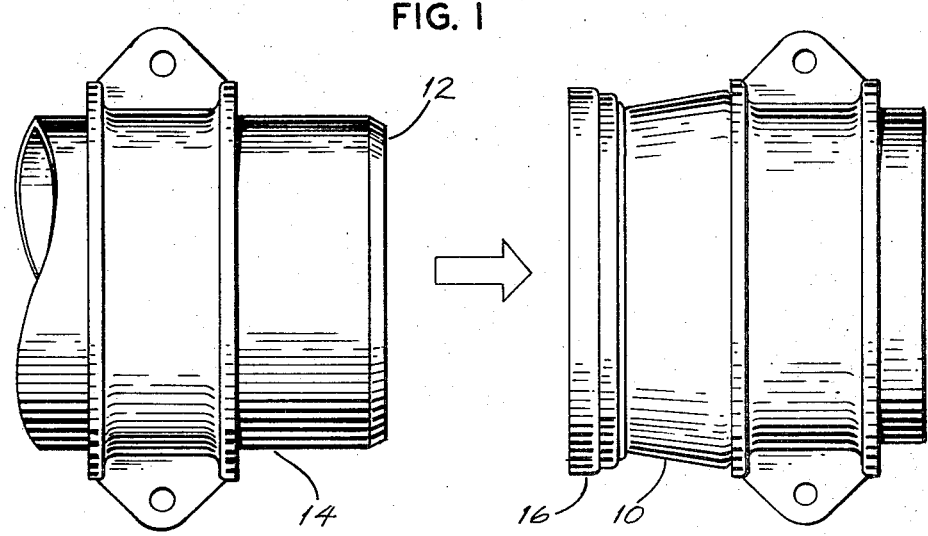
FIG. 2
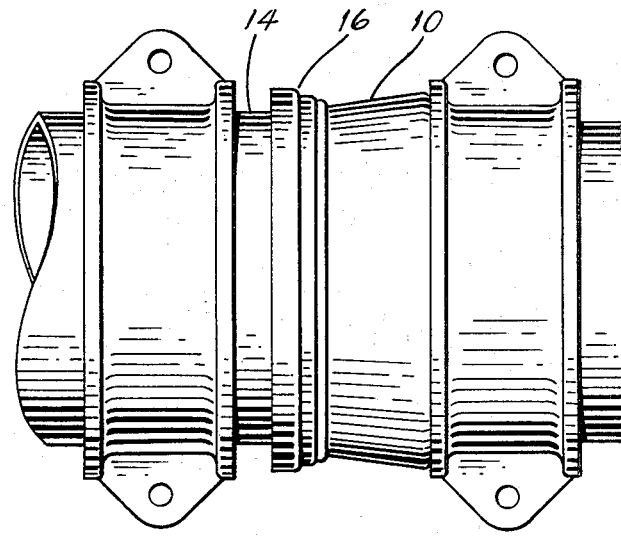
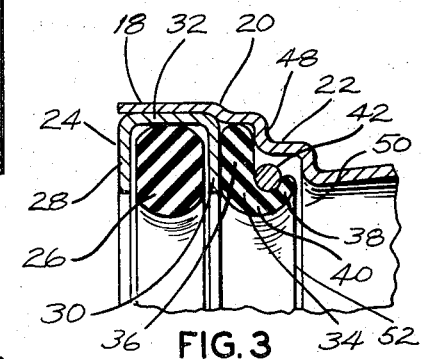
FIG. 3
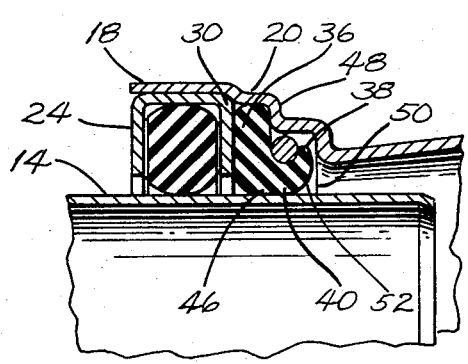
FIG. 4
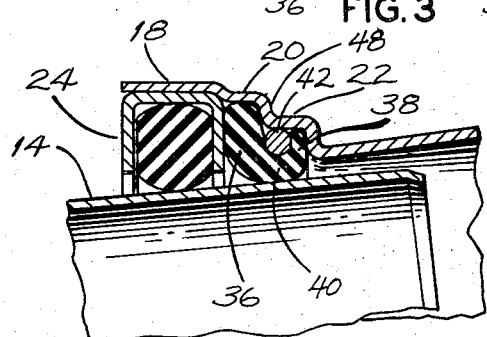
FIG. 5
INVENTORS:
HAROLD SHIRE
IRA R. NEWMAN
ATTORNEY:
Julius L. Rubinstein

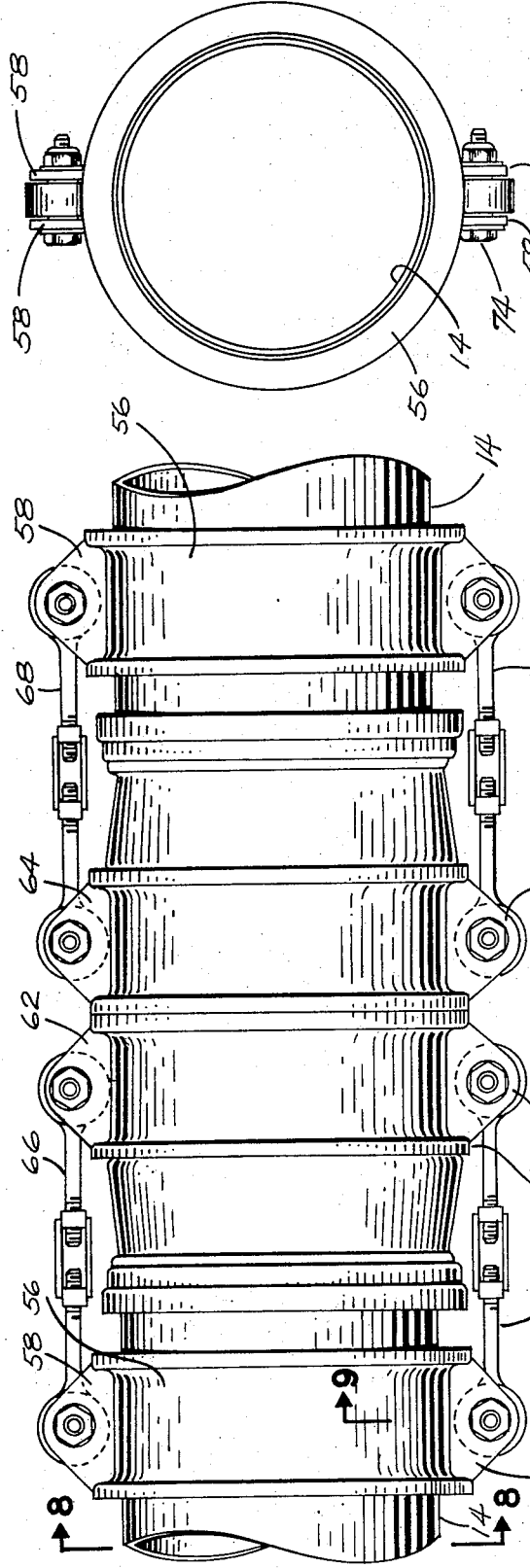

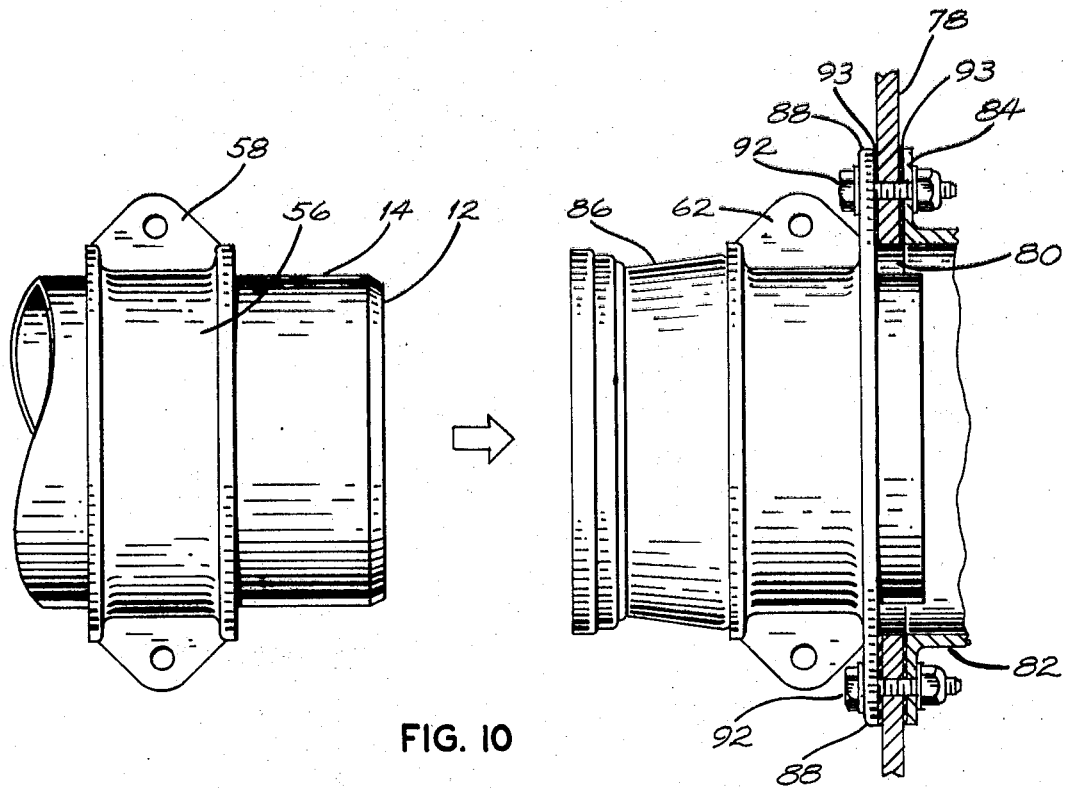
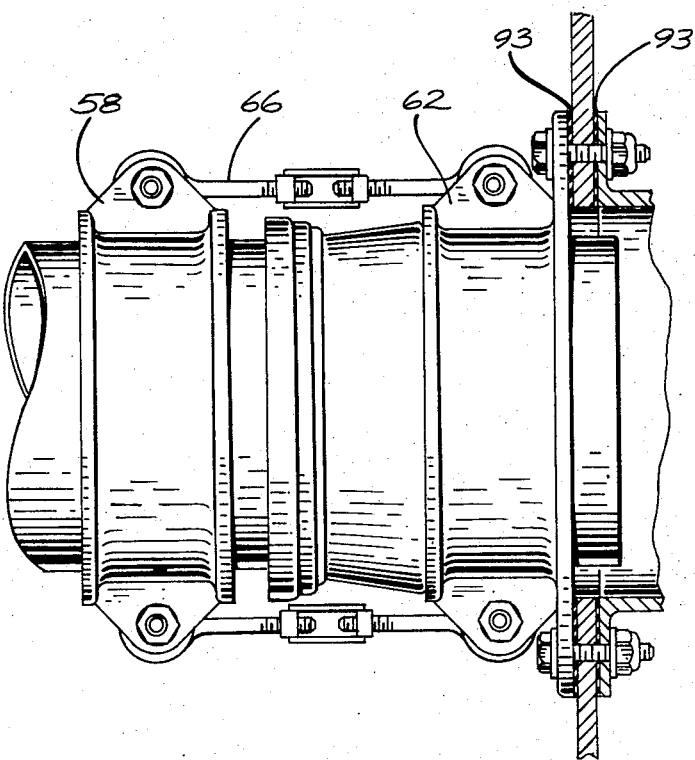
FIG. 10
FIG. 11

INVENTORS:
HAROLD SHIRE
IRA R. NEWMAN
ATTORNEY:

3,695,639

CONNECTOR

BRIEF SUMMARY

Some of the pipes in modern aircraft carry fluids, gases, or liquids which are highly flammable or toxic. The connectors for these pipes must have redundant or plural seals to prevent leakage in case of fire or in case of a failure in any single seal. In addition, multiple seals are used to withstand side loading pressures in the connector caused by flexing of the pipes which might produce forces which could destroy a single seal.

Heretofore, seals in connectors for such pipes were identical and were usually ring shaped and circular in cross-section. These seals were generally mounted in side by side relationship at the end of the connector housing. The seals were large enough to permit the outer surface of the pipes in the connectors to ride on and pivot on said seals to accommodate flexing and vibration during flight. However, it was found that the inner seal failed rapidly in comparison to the outer seal, thereby nullifying to some extent the advantage of using a double seal in the connector. The reason for the shorter useful life in the prior inner seal was because the movement of the end of the pipes inside the connector was generally greater over the inner seal than the outer seal.

In the present invention, the life of the inner seal is increased substantially by making it generally channel shaped in cross-section and including a first leg and a second smaller leg connected together by a web portion. The end of the connector tube includes first and second counterbores for positioning the inner seal in the end of the connector housing. The base of the second counterbore is in spaced relation to the inner side of the second leg of the second seal to permit the second leg of the inner seal to flex non-destructively when the pipe in the connector pivots on the seal or vibrates.

What is needed therefore, and comprises an important object of this invention, is to provide a connector with plural seals wherein the end of the connector and the inner seal are shaped so they coact to permit the inner seal to flex non-destructively when a pipe inside the connector riding on the plural seal pivots or vibrates.

This and other objects of this invention will become more apparent when better understood in light of the accompanying specification and drawings, wherein:

FIG. 1 is an elevational side view of the connector and pipe just before the pipe is inserted inside the end of the connector.

FIG. 2 is an elevational side view of the connector and pipe after the pipe is inserted inside the end of the connector.

FIG. 3 is a sectional elevational view of the end of the connector showing the position of the seals inside the connector before the pipe is inserted therein.

FIG. 4 is a sectional elevational view of the ends of the connector and pipe showing the surface of the pipe riding on the double seal inside the connector.

FIG. 5 is a sectional elevational view of the connector and the pipe showing the flexure of the inner seal when the pipe pivots inside the connector.

FIG. 6 is an elevational view showing a modified connector with double seals positioned at both ends of the connector housing, and with pipes connected thereto.

FIG. 7 is an elevational view showing how the connector shown in FIG. 6 permits the pipe connected thereto to pivot on the seals inside the connectors.

FIG. 8 is a sectional view taken on the line 8—8 of FIG. 6.

FIG. 9 is a sectional view taken on the line 9—9 of FIG. 6.

FIG. 10 shows a bulk head connector attached to a bulk head with a pipe in position to be connected thereto.

FIG. 11 shows the bulk head connector shown in FIG. 10 attached to a pipe.

Figure 12:
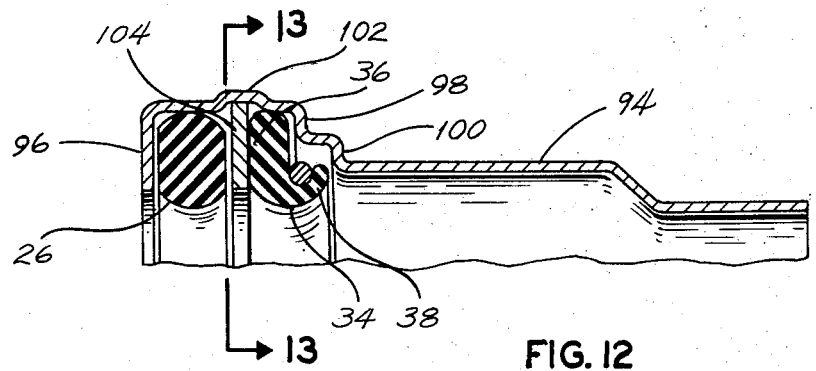
FIG. 12 shows a teaching of this invention employed with a modified connector housing.

Referring now to FIG. 1 of the drawing, a connector indicated generally by the reference numeral 10 is shown in spaced relationship to the end 12 of a pipe 14. In assembled relation the end 12 of the pipe 14 penetrates the end 16 of the connector 10, see FIGS. 2 and 4. In the particular embodiment shown, the end 16 of the connector is provided with three counterbores 18, 20 and 22, see FIG. 3. In addition, an inwardly open channel shaped divider or seal retaining ring 24 is secured to the counterbore portion 18 of the end 16 of the connector 10 by welding or any suitable means.

A first ring shaped seal 26 is mounted inside the channel of the seal ring retaining ring 24 and as seen in FIG. 3 this seal is generally circular in cross-section. As shown in FIG. 3 the diameter of the seal 26 is larger than the length of the legs of the divider or channel shaped seal retaining ring 24 so a portion of the seal 26 protrudes beyond the channel inwardly into the connector.

The ring shaped divider element or seal retaining ring includes an outer leg 28, an inner leg 30 and a connecting web portion 32. The web portion 32 is secured by welding or any suitable means to the inner surface of the counterbored portion 18, see FIG. 3.

Leg 30 of the channel 24 serves as the divider separating the outer seal 26 from the inner seal 34 and provides an additional fire resistant protective surface. As shown in FIGS. 3 and 4, seal 34 is ring shaped and is generally channel shaped in cross-section. This seal includes an outer leg 36 and a smaller inner leg 38 separated by a web portion 40. In the embodiment shown a garter spring 42 is mounted on the web portion 40 of the seal 34 for causing the web portion of the seal to exert a radially inwardly directed force on any pipe 14 inside the opening defined by the inner surface 46 of the base portion 40 of seal 34, see FIG. 4. With this arrangement, as the web portion 40 gradually hardens during use, the inwardly directed force exerted by the garter spring 42 maintains a sealing connection between the web portion 40 of the seal 34 and the outer surface of the pipe 14.

As shown in FIGS. 3 and 4 of the drawing, the outer leg 36 bears against and is positioned by the facing surfaces of leg 30 of the seal retaining ring 24 and the base 48 of the counterbore portion 20 in the end 16 of the connector housing 10.

As seen in FIGS. 3 and 4, the base 50 of the counterbored portion 22 in the end 16 of the connector 10 is in spaced relation to the inner surface 52 of the leg 38. This space is important because it permits non-destructive flexing of the legs 36 and 38 of the seal 34 when the end 12 of pipe 14 pivots inside the connector. When this happens the free end of leg 38 moves up toward the inner walls of the counterbored portion 22 and toward the outer leg 38 and flexes non-destructively, see FIG. 5. Without this space the inner seal would wear rapidly and failure would occur after a comparatively short time.

In the embodiment shown in FIG. 1, the connector housing 10 is provided with seals at only one end. As shown, however, in FIG. 6, the principles of this invention are applied to a connector 54 having double seals at both ends. The free ends 12 of pipes 14 extend inside the opposed ends of the connector housing 54, as shown in FIG. 6. These pipe ends ride on the seals 26 and 34 at the opposite ends of connector 54 to permit pivoting or flexing in the connector housing as described in connection with the embodiment shown in FIGS. 1 and 5.

In order to hold the pipes 14 inside the opposed ends of the connector housing 54 against internal pressure, a collar 56 embracing the outer surface of pipes 14 is secured thereto by welding or any suitable means, see FIGS. 8 and 9.

As seen in FIGS. 6, 8, and 9, collar 56 is provided with diametrically opposed radially outwardly extending spaced flange pairs 58. In addition, spaced flange pairs 62 and 64 are integrally formed with or are secured to the opposed ends of the connector 54, see FIG. 6. Turnbuckles 66 and 68 are secured between the flange pairs 58 and 62 and 58 and 64 respectively, as shown in FIGS. 6 and 7 of the drawing. It is noted that the ends 70 of the turnbuckle which extend between the flange pairs are provided with elongated slots 72, see FIG. 7. With this arrangement, the ends 12 of the pipes 14 penetrate at least a predetermined distance inside the opposed ends of the connector housing 54, but at the same time the slots 72 permit thermal expansion and contraction of the pipes inside the connector housing without introducing stress. This is an important factor considering that some pipes are exposed to wide temperature variations as the altitude of the aircraft changes.

Furthermore, the ends 12 of the pipes 14 ride on and pivot on the seals 26 and 34 at the opposed ends of the housing 64 permitting the connector housing 54 to accommodate substantial non-axial misalignment of the tubes 14, see FIG. 7. As seen in FIGS. 7, 8, and 9, bolts 74 extend through holes 76 in the flange pairs and through the slots 72 in the ends of the turnbuckles to permit thermal expansion and contraction.

As shown in FIGS. 10 and 11, the principles of this invention are applicable to bulkhead outlets. In particular, as shown in FIG. 10, a bulkhead 78 is provided with an opening 80 which is connected to a fluid outlet pipe 82. The fluid outlet pipe is provided with annular flanges 84 which are secured to one side of the bulkhead 78. The bulkhead connector 86 is provided with elongated annular flanges 88 at one end. These flanges are provided with openings through which retaining bolts 92 extend to retain both the bulkhead connector 86 and the fluid outlet pipe 82 to the opposite sides of the bulkhead 78, as shown in FIG. 11. Seals 93 of a type well known in the art extend between the flanges 88 and the bulkhead 78 and the flange 84 and the bulkhead 78 to prevent leakage of the gases through the facing surfaces of the flanges 88 and 84 and the bulkhead 78. The pipe 14 is connected to the bulkhead connector 86 as shown in FIG. 7 and 11. With this arrangement the end 12 of pipes 14 can pivot inside the connector 86 without breaking the seals 26 and 34 and at the same time the pipes and connector can accommodate thermal expansion and contraction.

The seals 26 and 34 can be used with other kinds of connector housings. In particular, as shown in FIG. 12, the connector 94 is provided with an integrally formed seal retaining flange 96 at its extreme end. The connector 94 is also counterbored defining a base portion 98. The connector 94 is also provided with an additional inwardly spaced counterbore defining an inwardly spaced base portion 100. As shown in FIG. 12, the length of the flange 96 is generally equal the sum total of the radial lengths of the bases 98 and 100, see FIG. 12. This arrangement defines a channel for holding the seals.

Figure 13:
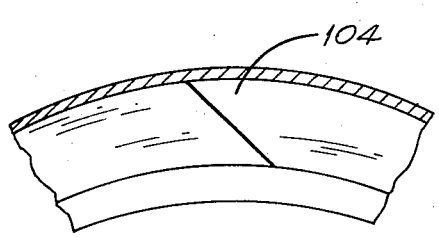
FIG. 13 is a sectional view taken on the line 13—13 of FIG. 12.

The connector 94 is provided with an inwardly open radially outwardly projecting groove 102 for receiving the outer circumference of a flat split washer 104. The outer edges of the split washer are secured by any suitable means, such as welding, to the inner surface of groove 102. After the split washer is mounted inside the connector 94, as shown in FIG. 12, the split ends may be welded together if desired, see FIG. 13.

The split washer 104 serves to divide the channel defined by flanges 96 and the base portions 98 and 100 into two portions with seal 26 mounted in the outer portion and seal 34 mounted in the inner portion, as shown in FIG. 12. Leg 36 of seal 34 may be bonded to the facing surface of the split washer 104 to hold it in position. Leg 38 of the seal 34 is in spaced relation to the base portion 100 to permit the leg 38 of the seal to flex when pipes in the connector vibrate or pivot as described above.

Figure 14:
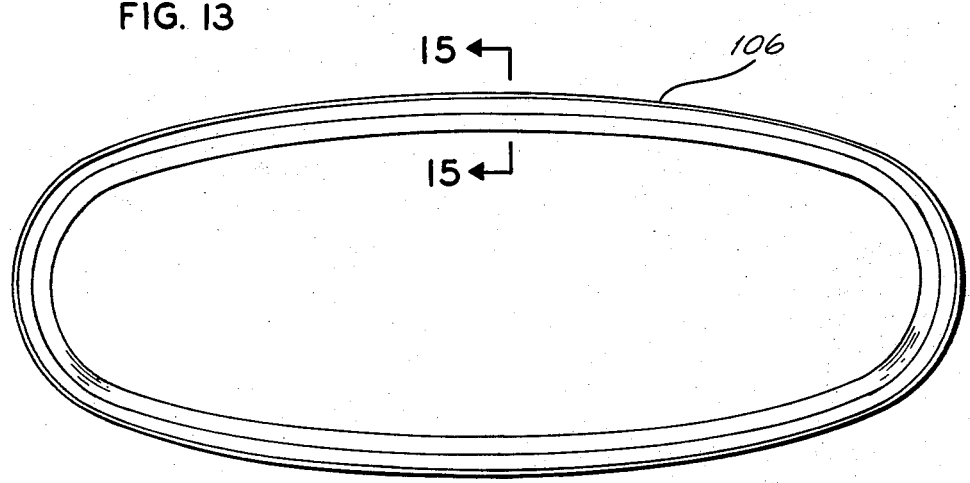
FIG. 14 shows a teaching of this invention employed in a connector housing which is eliptical in cross-section.

The principles of this invention can also be applied to connectors which are not circular in cross-section. In particular, as shown in FIG. 14, seals are mounted in a connector 106 which is elliptical in cross-section. This requires the outer seal 108 and the inner seal 110 to be elliptical rather than ring shaped so they can fit into the connector housing. Other than this, the cross-sectional shape of seals 108 and 110 are the same as seals 26 and 34.

The end of connector 106 is open without an integral flange. To mount the seals 108 and 110 inside the connector housing and hold them in spaced parallel relationship, a pair of elliptical elements 112 and 114, L-shaped in cross-section, are mounted inside the end 116 of the connector housing 106 as shown. As shown, the legs of the elements 112 and 114 are secured to the inner surface of the connector housing 106 by welding or any suitable means. This arrangement defines two seal holding compartments in which the seals 108 and 110 are mounted.

Figure 15:
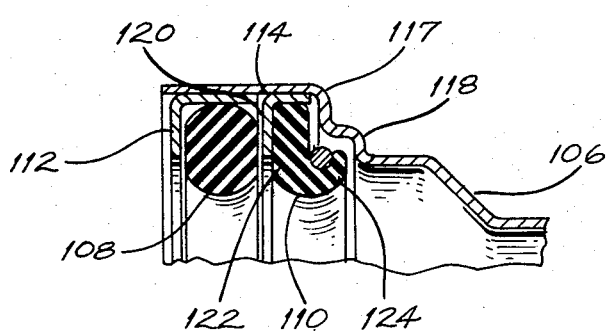
FIG. 15 is a sectional view taken on the line 15—15 of FIG. 14.

The connector 106 is provided with an elliptical counterbore defining an elliptical base 117. In addition, the housing 106 is provided with an additional inwardly spaced counterbore defining an inner base 118. With this arrangement, seal 110 is mounted inside the channel defined by the base 117 and leg 120 of element 114 with the leg 122 of seal 110 bearing against or bonded to leg 120. The inner leg 124 of the seal 110 is in spaced relation to the base 118 as shown in FIG. 15. This is to permit the legs 124 and 122 to flex when a pipe pivots inside the seal housing 106. It is, of course, understood that any pipe used with the connector 106 would itself have to be elliptical in cross-section.

The elliptical elements 112 and 114, L-shaped in cross-section, used to divide or define the seal receiving channels are important when the connector is not circular in cross-section. This is because L-shaped divider elements can be easily and economically fabricated to follow the periphery of connector housings having any cross-sectional shape.

To this point the inner seal has been shown to be channel shaped in cross-section and the outer seal has been shown to be circular in cross-section and solid. Under some circumstances, depending on the geometry of the pipes inserted inside the connector housing or the temperature and direction of the gas flow, it might be desirable to reverse the arrangement of the seals described above and to provide at least one channel shaped seal in the outer end of the connector housing. It is also contemplated that some circumstances could arise where it might be desirable for both seals in the connector housing to be channel shaped in cross-section for increased flexure.

Having described the invention, what I claim as new is:

1. A connector of the class described comprising a tubular housing, at least one end of said housing having seal rings retaining means, a plurality of seal rings mounted in side-by-side relationship in the end of said housing on said seal ring retaining means, at least one of said seal rings channel shaped in cross-section, said channel shaped seal including, spaced leg portions and a connecting web portion, a garter spring mounted on the web portion of said seal to cause said seal to exert radially inwardly directed force on any pipe in said connector.

2. A connector of the class described comprising a tubular housing, formations integrally formed on at least one end of said tubular housing for positioning seal rings in said housing in spaced side-by-side relationship, a plurality of seal rings mounted in said housing, means in said housing cooperating with said formation to hold said seal rings in spaced side-by-side relationship, and at least one of said seal rings channel shaped in cross-section, said channel shaped seal including, spaced leg portions and a connecting web portion, and a garter spring mounted on the web portion of said seal to cause said seal to exert radially inwardly directed force on any pipes in said connector.

3. A connector of the class described comprising a tubular housing, a counterbored portion formed on at least one end of said housing, a divider strip following the contour of said one end of said tubular housing and secured to the inner surface thereof, said divider strip cooperating with said counterbored portion of said housing to provide outer and inner seal ring receiving channels in said housing, said outer seal receiving channel being located adjacent said one end of said tubular housing and said inner seal receiving channel being located further axially inwardly of said one end, a first seal mounted in said outer channel and a second seal mounted in said inner channel, said second seal channel shaped in cross-section and opening radially outwardly and including a first leg and a second leg separated by a web portion, said second leg in axially inwardly spaced relation to said first leg, said first leg bearing against said divider strip, said second leg in spaced relation to the base and inner wall of said connector counterbore whereby when a pipe is in said connector with the outer surface of the pipe in sealing engagement with said seals, any pivoting of said pipe causes said inner leg to move toward said inner wall and said first leg so the inner seal can flex without destruction.

4. A connector of the class described comprising a tubular housing, a counterbored portion formed on at least one end of said housing, a divider strip following the contour of said one end of said tubular housing and secured to the inner surface thereof, said divider strip cooperating with said counterbored portion of said housing to provide outer and inner seal ring receiving channels in said housing, a first seal mounted in said outer channel and a second seal mounted in said inner channel, said second seal channel shaped in cross-section including a first leg and a second leg separated by a web portion, said second leg in inwardly spaced relation to said first leg, said first leg bearing against said divider strip, said second leg in spaced relation to the base and inner wall of said connector counterbore whereby when a pipe is in said connector with the outer surface of the pipe in sealing engagement with said seals, any pivoting of said pipe causes said inner leg to move toward said inner wall and said first leg so the inner seal can flex without destruction, said divider strip is ring-shaped and channel shaped in cross-section and including a first leg and a second leg connected by a web portion, said web portion secured to the inner surface of the end of said tube and defining an outer seal ring receiving channel, said first leg of said channel shaped seal bearing against the inner leg of said channel shaped element.

5. A connector of the class described comprising a tubular housing, a first and second counterbore formed on at least one end of said housing, a ring shaped divider element channel shaped in cross-section and including an outer leg and an inner leg connected by a web portion, said web portion integrally secured to the inner surface of said end of said housing and defining a first outer seal ring receiving portion, said inner leg and the base of said first and second counterbores defining a second seal ring receiving portion, a first seal mounted in said outer seal ring receiving portion and a second seal mounted in said second seal ring receiving portion, said second seal generally channel shaped in cross-section and including an outer leg and an inner leg separated by a web portion, the outer surface of said outer leg of said seal bearing against the facing surface of the inner leg of said channel shaped divider element, the inner surface of said outer leg bearing against the base of said counterbore to locate said second seal ring in said second seal ring's receiving channel, said second leg in spaced relation to the base of said second counterbore and to its inner wall whereby when a pipe is in said connector with its outer surface in sealing engagement with said seals any pivoting of said pipe causes said inner leg of said second seal to move toward said inner wall and said first leg so the second seal can flex non-destructively.

6. The connector described in claim 5 including a garter spring mounted on the web of said second seal to cause said second seal to exert radially inwardly directed force on the outer surface of said pipe to hold the pipe in sealing engagement with said pipe.

7. The connector described in claim 5 including collars formed on the facing ends of the pipe and the connector, diametrically opposed flange pairs formed on said collars, turnbuckles mounted on said flange pairs to hold said pipe and said connector together when the pipe and the connector are pressurized.

8. The connector described in claim 7 including means on said turnbuckle and said flange pairs to permit the pipe and the connector to accommodate thermal expansion and contraction without stress.

9. A connector of the class described comprising a tubular housing, first and second counterbores formed at each end of said housing, ring shaped divider elements channel shaped in cross-section and including an outer leg and an inner leg connected by a web portion, the web portion of each divider element secured to the inner surface of the opposed end of said housing and defining a first outer seal ring receiving portion at each end of said housing, said inner leg and the bases of said first and second counterbores defining a second seal ring receiving portion, a first seal mounted in said outer seal ring receiving portion, said first seal generally circular in cross-section, a second seal mounted in said second seal receiving portion at each end of said housing, said second seal generally channel shaped in cross-section and including an outer leg and an inner leg separated by a web portion, the outer surface of said outer leg bearing against the facing surface of the inner leg of each channel shaped divider element at said opposed ends of said housing, the inner surface of said inner leg bearing against the base of said first counterbored portion at each opposed end of said housing to locate the second seal ring in said second seal ring receiving channel, said second leg of said second seal ring in spaced relation to the base of said second counterbore and to its inner wall at the opposed ends of said housing whereby when the pipes are in each end of said housing with their outer surfaces in sealing engagement with said seals, pivoting of said pipes on said seals causes said inner legs of said second seals to move toward said inner walls and said first legs of said second seals so said second seals can flex non-destructively while said pipes pivot in the opposite ends of said connector, collars mounted on each end of said pipe and the ends of said housing, flange pairs mounted on diametrically opposite ends of said collars, turnbuckles mounted between said flange pairs on said pipes and the associated flange pairs on said housing to hold said pipes and housing together when the pipes and housing are pressurized.

10. The connector described in claim 9 wherein said flanges and turnbuckles have means thereon to permit the pipes and connectors to accommodate thermal expansion and contraction without stress.

11. A connector of the class described comprising a tubular housing, a first and second counterbore formed at one end of said housing, a ring shaped divider element channel shaped in cross-section and including an outer leg and an inner leg connected by a web portion, the web portion of said divider element secured to the inner surface of one end of said tubular housing and defining an outer seal ring receiving bore, said inner leg and the bases of said first and second counterbores defining a second seal ring receiving portion, a first ring shaped seal mounted in said outer seal ring receiving portion, said first seal ring generally circular in cross-section, a second ring shaped seal mounted in said inner seal ring receiving portion, said second ring shaped seal channel shaped in cross-section and including an outer leg and an inner leg separated by a web portion, the outer surface of said outer leg bearing against the facing surface of the inner leg of said channel shaped divider element, the inner surface of said outer leg bearing against the base of said first counterbore to locate the second seal ring in said second seal ring receiving channel, the second leg of said second seal in spaced relation to the base of said second counterbore and to its inner wall whereby when a pipe is inserted in said connector with its outer surface in sealing engagement with said pipe any pivoting of said pipe causes said inner leg of said second seal to move toward said first leg and the inner wall so the second seal flexes non-destructively when said pipe pivots in said housing, collars formed on the facing ends of said pipe and connector, diametrically opposed flange pairs formed on said collars, turnbuckles mounted on said flange pairs to hold said pipes and said housing connector together when the pipe and connector are pressurized, and a bulkhead retaining flange formed on the end of said connector housing opposite said first and second counterbore, said retaining flange having bolt receiving holes thereon for receiving bolts whereby said connector housing can be attached to the gas outlet of a bulkhead.

12. A connector of the class described comprising a tubular housing, the end of said housing having an integrally formed inwardly directed flange, a first and second counterbore formed adjacent said end of said housing, a ring shaped divider element formed from a resilient split ring, the outer edge of said split ring rigidly secured to the inner surface of said housing and cooperating with said integral flange to form a first seal ring receiving portion, said ring shaped divider element cooperating with the bases of said counterbores to form a second seal ring receiving channel, a first ring shaped seal mounted in said first seal ring receiving portion, said first ring shaped seal generally circular in cross-section, a second seal mounted in said second seal ring receiving portion, said second seal including an outer leg and an inner leg separated by a web portion, the outer surface of said outer leg of said seal bearing against the facing surface of said split ring, the inner surface of the outer leg of said seal bearing against the base of said counterbore to position said second seal ring in said second seal ring receiving portion, said second leg of said second seal in spaced relation to the base of said second counterbore and to its associated inner walls whereby when a pipe is in said connector with its outer surface in sealing engagement with said seals, any pivoting of said pipe in said connector causes said inner leg of said second seal to move toward said inner wall and said first leg of said second whereby said second seal can flex non-destructively while said pipe pivots in said housing.

13. The connector described in claim 12 including collars formed on the facing ends of said pipe and connector, diametrically opposed flange pairs formed on said collars, turnbuckles mounted on said flange pairs to hold said pipes and connector together when the pipes and connector are pressurized.

14. A connector of the class described comprising a tubular housing elliptical in cross-section, a first and second counterbore formed on at least one end of said housing, first and second ring shaped divider elements L-shaped in cross-section mounted on the end of said housing with one leg of each divider element extending radially inwardly and disposed so one leg of the first divider element is substantially at the extreme end of said housing and defining thereby first and second seal ring channels, a first elliptical seal mounted in said first seal ring receiving channel and a second elliptical seal mounted in said second seal ring receiving channel, said first seal generally circular in cross-section, said second seal ring generally channel shaped in cross-section and including a first leg and a second leg separated by a web portion, the outer surface of said first leg of said seal bearing against the facing surface of a leg of said second divider element, the inner surface of said first leg bearing against the base of said first counterbore to position said second seal in said second seal ring receiving channel, said second leg in spaced relation to the base of said second counterbore and to its inner wall whereby when a pipe elliptical in cross-section is in said connector with its outer surface in sealing engagement with said seals any flexing or pivoting of said pipe causes the inner leg of said second seal to move towards the inner wall and said first leg so the second seal can flex non-destructively and permit said pipe to pivot in said housing.

* * * * *